(12) United States Patent
Lin et al.

(10) Patent No.: US 10,321,476 B2
(45) Date of Patent: Jun. 11, 2019

(54) DATA TRANSMISSION METHOD, BASE STATION, AND USER EQUIPMENT

(71) Applicant: China Academy of Telecommunications Technology, Beijing (CN)

(72) Inventors: Yanan Lin, Beijing (CN); Zukang Shen, Beijing (CN); Xuejuan Gao, Beijing (CN); Qianqian Si, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 305 days.

(21) Appl. No.: 15/109,223

(22) PCT Filed: Jan. 15, 2015

(86) PCT No.: PCT/CN2015/070779
§ 371 (c)(1),
(2) Date: Jun. 30, 2016

(87) PCT Pub. No.: WO2015/106694
PCT Pub. Date: Jul. 23, 2015

(65) Prior Publication Data
US 2017/0006626 A1    Jan. 5, 2017

(30) Foreign Application Priority Data

Jan. 16, 2014 (CN) .......................... 2014 1 0020995

(51) Int. Cl.
*H04W 72/12* (2009.01)
*H04W 72/04* (2009.01)
(Continued)

(52) U.S. Cl.
CPC ....... *H04W 72/1273* (2013.01); *H04W 16/14* (2013.01); *H04W 72/0446* (2013.01);
(Continued)

(58) Field of Classification Search
CPC ......... H04W 72/1273; H04W 72/1289; H04W 16/14; H04W 72/0446; H04W 72/0453
See application file for complete search history.

(56) References Cited

U.S. PATENT DOCUMENTS

2012/0039239 A1* 2/2012 Park ...................... H04B 7/155
370/315
2013/0077576 A1* 3/2013 Abe ...................... H04W 16/16
370/329

(Continued)

FOREIGN PATENT DOCUMENTS

CN     101388760     3/2009
CN     101583141     11/2009
(Continued)

OTHER PUBLICATIONS

3rd Generation Partnership Project; Technical Specification Group Radio Access Network; Evolved Universal Terrestrial Radio Access (E-UTRA); Multiplexing and channel coding (Release 10); 3GPP TS 36.212 v10.4.0 (Dec. 2011).
(Continued)

*Primary Examiner* — Gbemileke J Onamuti
(74) *Attorney, Agent, or Firm* — Foley & Lardner LLP

(57) ABSTRACT

A data transmission method is provided. The method includes: a base station detecting a preset frequency band, and determining whether an idle for a first length of time exists in a predetermined period of time in a subframe p of the preset frequency band; and if the idle for the first length of time is detected, the base station scheduling data on N consecutive subframes starting from a following subframe
(Continued)

of the subframe p and transmitting the data, and setting last A symbols in the last one among the N consecutive subframes to be idle, N and A being both positive integers.

20 Claims, 5 Drawing Sheets

(51) Int. Cl.
*H04W 16/14* (2009.01)
*H04W 74/08* (2009.01)

(52) U.S. Cl.
CPC ... *H04W 72/0453* (2013.01); *H04W 72/1289* (2013.01); *H04W 74/0816* (2013.01)

(56) References Cited

U.S. PATENT DOCUMENTS

2013/0230018 A1* 9/2013 Yagi ................... H04L 5/0048
370/330
2014/0003387 A1 1/2014 Lee et al.
2014/0064204 A1* 3/2014 Seo ..................... H04L 5/0035
370/329
2014/0185497 A1* 7/2014 Wolf ..................... H04W 28/26
370/294

FOREIGN PATENT DOCUMENTS

| CN | 101686478 | 3/2010 |
| CN | 102333341 | 1/2012 |
| WO | WO-2013/087835 A1 | 6/2013 |

OTHER PUBLICATIONS

International Search Report for PCT/CN2015/070779 dated Apr. 24, 2015.
Chinese Office Action on Appl. No. CN201410020995.8 dated Jun. 6, 2018.

* cited by examiner

DATA TRANSMISSION METHOD, BASE STATION, AND USER EQUIPMENT

This application is a US National Stage of International Application No. PCT/CN2015/070779, filed on 15 Jan. 2015, designating the United States, and claiming the benefit of Chinese Patent Application No. 201410020995.8, filed with the Chinese Patent Office on Jan. 16, 2014 and entitled "Method, system and device for transmitting reference signal and for signal measurement", which is hereby incorporated by reference in its entirety.

FIELD

The present application relates to the field of mobile communications, and particularly to a method for transmitting data, an eNB, and a User Equipment (UE).

BACKGROUND

1. Long Term Evolution (LTE) System

The LTE system supports two duplex modes of Frequency Division Duplex (FDD) and Time Division Duplex (TDD), in which different types of frame structures are applied. The two types of frame structures are common in that each radio frame includes 10 sub-frames of 1 ms, where the first type of frame structure is applied to the FDD system, and the second type of frame structure is applied to the TDD system. In the first type of frame structure, 10 sub-frames in a radio frame have the same transmission direction which is in the uplink or the downlink. In the second type of radio frame, each radio frame includes three kinds of different sub-frames including a downlink sub-frame, an uplink sub-frame, and a special sub-frame, where the special sub-frame includes three components including a Downlink Pilot Time Slot (DwPTS), a Guard Period (GP), and an Uplink Pilot Time Slot (UpPTS).

For a normal Cyclic Prefix (CP), a sub-frame includes 14 symbols including Orthogonal Frequency Division Multiplex (OFDM) symbols in the downlink, and Single-Carrier Frequency-Division Multiple Access (SC-FDMA) symbols in the uplink. For an extended CP, a sub-frame includes 12 symbols.

2. Spectrum Resources

Existing spectrum resources can be categorized into licensed spectrums and unlicensed spectrums, where the licensed spectrums are allocated dedicated spectrums, where different LTE operators are provided with different dedicated licensed spectrums so that the LTE operations will not suffer from interference of the other LTE operators. The unlicensed spectrums are shared spectrum resources which are not allocated, so that the resources in the unlicensed frequency bands can be shared by a number of types of systems.

At present, the spectrum resources have become increasingly insufficient as the number of mobile data services is constantly growing, so that if the networks are deployed and the services are transmitted only over the licensed spectrum resources, then the growing number of services may not be accommodated, so the services may be deployed and transmitted over the unlicensed spectrum resources in the LTE system (i.e., Unlicensed LTE (U-LTE or LTE-U)) to thereby improve the experience of a user, and extend the coverage thereof. However, there has been so far absent a definitive solution to how the LTE system operates over the unlicensed spectrum resources, and how a number of LTE systems take over the unlicensed frequency bands in a fairly and friendly manner, and also access efficiently the resources in the unlicensed frequency bands.

SUMMARY

In view of the technical problem above in the prior art, the application proposes a method for transmitting data, and an eNB and a UE.

In order to attain the object above, there is provided a method for transmitting data according to an aspect of the application.

The method for transmitting data includes:

detecting, by an eNB, a predetermined frequency band for being idle for a first length of time in a predetermined period of time in a sub-frame p in the predetermined frequency band; and if the idle for the first length of time is detected, then scheduling, by the eNB, data in N consecutive sub-frames starting from a sub-frame next to the sub-frame p and performing data transmission for the data, and setting last A symbols in the last one of the consecutive N sub-frames to be idle, wherein the total length of time corresponding to the A symbols is no less than the first length of time, and both N and A are positive integers.

Moreover the method for transmitting data includes: sending, by the eNB, Downlink Control Signaling (DCI) to a UE to schedule the UE to receive or send data in the predetermined frequency band, wherein the DCI includes information indicating whether last A symbols in a sub-frame scheduled by the DCI are idle, or the number of last idle symbols.

Where the value of A is prescribed, or signaled by the eNB to the UE.

Where the value of the first length of time is prescribed, or determined by exchanging information between the eNB and another eNB.

Optionally if the value of the first length of time is prescribed, then the value of the first length of time can be determined as a function of a system bandwidth, or a necessary delay in processing by the eNB.

Optionally on one hand, the predetermined period of time is located in the last component of the sub-frame p in the predetermined frequency band.

Optionally on the other hand, the sub-frame p includes at least a first interval of time, a second interval of time, and a third interval of time in the predetermined frequency band, wherein the first interval of time is located at the starting position of the sub-frame p, the third interval of time is located at the ending position of the sub-frame p, and the second interval of time is located before the third interval of time, and does not overlap with the first interval of time; and the length of time of neither the second interval of time nor the third interval of time is less than the first length of time; and if the eNB does not schedule the data to be transmitted in the first interval of time of the sub-frame p, then the predetermined period of time is the second interval of time; and if the eNB schedules the data to be transmitted in the first interval of time of the sub-frame p, then the predetermined period of time is the third interval of time.

Where the value of the first interval of time and/or the second interval of time and/or the third interval of time is prescribed, or determined by exchanging information between the eNB and another eNB.

Where if the eNB sets the last A symbols in the last one of the N consecutive sub-frames to be idle, then the total length of time corresponding to the last A symbols is no less than the sum of the lengths of the second interval of time and the third interval of time.

Moreover the method for transmitting data further includes: if the predetermined period of time is the second interval of time, then sending, by the eNB, a predetermined signal in the predetermined frequency band in the last C symbols in the third interval of time, wherein C is a positive integer.

Where the predetermined signal includes a synchronization signal and/or a measurement reference signal.

Where the value of C is prescribed, or signaled by the eNB to the UE.

In the solution above, the N sub-frames includes one or more of: a downlink sub-frame, an uplink sub-frame, and a special sub-frame.

In the solution above, the predetermined frequency band includes an unlicensed frequency band.

There is provided a method for transmitting data according to another aspect of the application.

The method for transmitting data includes: detecting, by a UE, Downlink Control Signaling (DCI) sent by an eNB to schedule the UE to receive or send data in a sub-frame p in a predetermined frequency band; if the DCI is detected, then determining, by the UE, from the DCI the number B of last idle symbols in the sub-frame p, wherein B is zero or a positive integer; and receiving or sending, by the UE, the data in the sub-frame p in the predetermined frequency band according to the number B of idle symbols.

Where determining, by the UE, from the DCI the number B of last idle symbols in the sub-frame p includes: if the DCI includes information indicating that the last A symbols in the sub-frame p are idle, then determining, by the UE, the number B of symbols as A; otherwise, determining the number B of symbols as zero, wherein A is a positive integer, and the total length of time corresponding to the last A symbols is no less than a first length of time.

Optionally the value of A is prescribed, or signaled by the eNB to the UE.

Optionally the value of the first length of time is prescribed, or determined by exchanging information between the eNB and another eNB.

Optionally if the value of the first length of time is prescribed, then the value of the first length of time can be determined as a function of a system bandwidth, or a necessary delay in processing by the eNB.

Moreover determining, by the UE, from the DCI the number B of last idle symbols in the sub-frame p includes: if the DCI includes information indicating the number of last idle symbols in the sub-frame p, then determining the number B of symbols as the number of last idle symbols indicated by the DCI.

Furthermore the method for transmitting data includes: if no DCI is detected, then receiving, by the UE, a predetermined signal sent by the eNB in the last C symbols in the sub-frame p in the predetermined frequency band, wherein C is zero or a positive integer.

Where the predetermined signal includes a synchronization signal and/or a measurement reference signal.

Where the value of C is prescribed, or signaled by the eNB to the UE.

Where receiving or sending, by the UE, the data in the sub-frame p in the predetermined frequency band according to the number B of idle symbols includes: if the data scheduled by the DCI are downlink data, then receiving, by the UE, the data in the first (L-B) symbols in the sub-frame p in the predetermined frequency band; and if the data scheduled by the DCI are uplink data, then transmitting, by the UE, the data in the first (L-B) symbols in the sub-frame p in the predetermined frequency band, wherein L is the largest number of symbols in the sub-frame p.

In the solution above, the predetermined frequency band includes an unlicensed frequency band.

There is provided an eNB according to a further aspect of the application.

The eNB includes: a detecting module of the eNB is configured to detect a predetermined frequency band for being idle for a first length of time in a predetermined period of time in a sub-frame p in the predetermined frequency band; and a processing module of the eNB is configured, if the idle for the first length of time is detected, to schedule data in N consecutive sub-frames starting from a sub-frame next to the sub-frame p and to perform data transmission for the data, and to set last A symbols in the last one of the consecutive N sub-frames to be idle, wherein the total length of time corresponding to the A symbols is no less than the first length of time, and both N and A are positive integers.

Moreover the eNB further includes: a first sending module configured to send Downlink Control Signaling (DCI) to a UE to schedule the UE to receive or send data in the predetermined frequency band, wherein the DCI includes information indicating whether last A symbols in a sub-frame scheduled by the DCI are idle, or the number of last idle symbols.

Where the value of A is prescribed, or signaled by the eNB to the UE.

Where the value of the first length of time is prescribed, or determined by exchanging information between the eNB and another eNB.

Optionally if the value of the first length of time is prescribed, then the value of the first length of time can be determined as a function of a system bandwidth, or a necessary delay in processing by the eNB.

Optionally on one hand, the predetermined period of time is located in the last component of the sub-frame p in the predetermined frequency band.

Optionally on the other hand, the sub-frame p includes at least a first interval of time, a second interval of time, and a third interval of time in the predetermined frequency band, wherein the first interval of time is located at the starting position of the sub-frame p, the third interval of time is located at the ending position of the sub-frame p, and the second interval of time is located before the third interval of time, and does not overlap with the first interval of time; and the length of time of neither the second interval of time nor the third interval of time is less than the first length of time; and if the processing module of the eNB does not schedule the data to be transmitted in the first interval of time of the sub-frame p, then the predetermined period of time is the second interval of time; and if the processing module of the eNB schedules the data to be transmitted in the first interval of time of the sub-frame p, then the predetermined period of time is the third interval of time.

Where the value of the first interval of time and/or the second interval of time and/or the third interval of time is prescribed, or determined by exchanging information between the eNB and another eNB.

Where if the processing module of the eNB sets the last A symbols in the last one of the N consecutive sub-frames to be idle, then the total length of time corresponding to the last A symbols is no less than the sum of the lengths of the second interval of time and the third interval of time.

Furthermore the eNB further includes: a second sending module configured, if the predetermined period of time is the second interval of time, to send a predetermined signal in the predetermined frequency band in the last C symbols in the third interval of time, wherein C is a positive integer.

Where the predetermined signal includes a synchronization signal and/or a measurement reference signal.

Where the value of C is prescribed, or signaled by the eNB to the UE.

In the solution above, the N sub-frames includes one or more of: a downlink sub-frame, an uplink sub-frame, and a special sub-frame.

In the solution above, the predetermined frequency band includes an unlicensed frequency band.

There is provided a UE according to still another aspect of the application.

The UE includes:

a detecting module of the UE configured to detect Downlink Control Signaling (DCI) sent by an eNB to schedule the UE to receive or send data in a sub-frame p in a predetermined frequency band;

a determining module of the UE configured, if the DCI is detected, to determine from the DCI the number B of last idle symbols in the sub-frame p, wherein B is zero or a positive integer; and a processing module of the UE configured to receive or send the data in the sub-frame p in the predetermined frequency band according to the number B of idle symbols.

Where the determining module of the UE further includes: a first determining sub-module configured, if the DCI includes information indicating that the last A symbols in the sub-frame p are idle, to determine the number B of symbols as A; otherwise, to determine the number B of symbols as zero, wherein A is a positive integer, and the total length of time corresponding to the last A symbols is no less than a first length of time.

Where the value of A is prescribed, or signaled by the eNB to the UE.

Where the value of the first length of time is prescribed, or determined by exchanging information between the eNB and another eNB.

Optionally if the value of the first length of time is prescribed, then the value of the first length of time can be determined as a function of a system bandwidth, or a necessary delay in processing by the eNB.

Moreover the determining module of the UE further includes: a second determining sub-module configured, if the DCI includes information indicating the number of last idle symbols in the sub-frame p, to determine the number B of symbols as the number of last idle symbols indicated by the DCI.

Furthermore the UE further includes: a receiving module configured, if no DCI is detected, to receive a predetermined signal sent by the eNB in the last C symbols in the sub-frame p in the predetermined frequency band, wherein C is zero or a positive integer.

Where the predetermined signal includes a synchronization signal and/or a measurement reference signal.

Where the value of C is prescribed, or signaled by the eNB to the UE.

Where the processing module of the UE further includes: a receiving sub-module configured, if the data scheduled by the DCI are downlink data, to receive the data in the first (L-B) symbols in the sub-frame p in the predetermined frequency band; and a sending sub-module configured, if the data scheduled by the DCI are uplink data, to send the data in the first (L-B) symbols in the sub-frame p in the predetermined frequency band, wherein L is the largest number of symbols in the sub-frame p.

In the solution above, the predetermined frequency band includes an unlicensed frequency band.

In the application, a predetermined frequency band is detected for being idle for a length of time in a predetermined period of time in a sub-frame in the predetermined frequency hand; and if the length of time is detected, then it can be determined that a carrier in the predetermined frequency band is idle, so that data can be scheduled to be transmitted in a number of consecutive sub-frames starting from a sub-frame next to the sub-frame, thus enabling the LTE system to operate in the predetermined frequency band. Moreover in the application, a predetermined number of last symbols in the last one of the consecutive sub-frames are set to be idle, so that a next eNB can detect in the idle symbols, and decide data to be scheduled, thus enabling the LTE systems to operate fairly and efficiently in the predetermined period of time.

BRIEF DESCRIPTION OF THE DRAWINGS

In order to make the technical solutions according to the embodiments of the application or in the prior art more apparent, the drawings to which reference is made in the description of the embodiments or the prior art will be described below briefly, and apparently the drawings described below are merely illustrative of some of the embodiments of the application, and those ordinarily skilled in the art can further obtain other drawings from these drawings without any inventive effort. In the drawings.

DETAILED DESCRIPTION OF THE EMBODIMENTS

Figure 1:
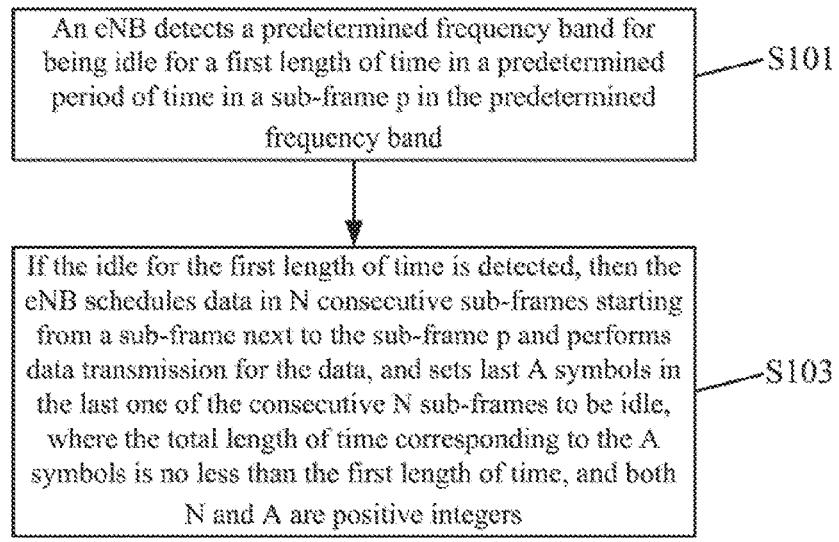
FIG. 1 is a schematic flow chart of a method for transmitting data according to an embodiment of the application.

Exemplary embodiments of the application will be described below in details with reference to the drawings. For the sake of clarity and conciseness, not all the features of an actual implementation will not be described in this specification. However, it shall be appreciated that in the development of any such actual embodiment, numerous implementation-specific decisions shall be made to achieve the developers' specific goals, such as compliance with system-related and business-related constraints, which will vary from one implementation to another. Moreover, it shall be further appreciated that such a development effort might be complex and time-consuming, but will nevertheless be a routine undertaking for those of ordinary skill in the art having the benefit of this disclosure.

It shall be further noted here that only the apparatus structures and/or process steps closely relevant to the solution according to the application are illustrated in the drawings, but other details less relevant to the application have been omitted, so as not to obscure the application due to the unnecessary details.

There is provided a method for transmitting data according to an embodiment of the application.

As illustrated in FIG. 1, a method for transmitting data according to an embodiment of the application includes:

In the step S101, an eNB detects a predetermined frequency band for being idle for a first length of time in a predetermined period of time in a sub-frame p in the predetermined frequency band; and In the step S103, if the idle for the first length of time is detected, then the eNB schedules data in N consecutive sub-frames starting from a sub-frame next to the sub-frame p and performs data transmission for the data, and sets last A symbols in the last one of the consecutive N sub-frames to be idle, where the total length of time corresponding to the A symbols is no less than the first length of time, and both N and A are positive integers.

Moreover the method for transmitting data further includes: the eNB sends Downlink Control Signaling (DCI) to a UE to schedule the UE to receive or send data in the predetermined frequency band, where the DCI includes information indicating whether last A symbols in a sub-frame scheduled by the DCI are idle, or the number of last idle symbols.

Where the value of A is prescribed, or signaled by the eNB to the UE.

Where the value of the first length of time is prescribed, or determined by exchanging information between the eNB and another eNB.

Optionally if the value of the first length of time is prescribed, then the value of the first length of time can be determined as a function of a system bandwidth, or a necessary delay in processing by the eNB.

Optionally on one hand, the predetermined period of time is located in the last component of the sub-frame p in the predetermined frequency band.

Optionally on the other hand, the sub-frame p includes at least a first interval of time, a second interval of time, and a third interval of time in the predetermined frequency band; where the first interval of time is located at the starting position of the sub-frame p, the third interval of time is located at the ending position of the sub-frame p, and the second interval of time is located before the third interval of time, and does not overlap with the first interval of time; and the length of time of neither the second interval of time nor the third interval of time is less than the first length of time; and if the eNB does not schedule the data to be transmitted in the first interval of time of the sub-frame p, then the predetermined period of time is the second interval of time; and if the eNB schedules the data to be transmitted in the first interval of time of the sub-frame p, then the predetermined period of time is the third interval of time.

Where the value of the first interval of time and/or the second interval of time and/or the third interval of time is prescribed, or determined by exchanging information between the eNB and another eNB.

Where if the eNB sets the last A symbols in the last one of the N consecutive sub-frames to be idle, then the total length of time corresponding to the last A symbols is no less than the sum of the lengths of the second interval of time and the third interval of time.

Moreover the method for transmitting data further includes: if the predetermined period of time is the second interval of time, then the eNB sends a predetermined signal in the predetermined frequency band in the last C symbols in the third interval of time, where C is a positive integer.

Where the predetermined signal includes a synchronization signal and/or a measurement reference signal.

Where the value of C is prescribed, or signaled by the eNB to the UE.

In the solution above, the N sub-frames includes one or more of a downlink sub-frame, an uplink sub-frame, and a special sub-frame.

In the solution above, the predetermined frequency band includes an unlicensed frequency band.

There is provided a method for transmitting data according to an embodiment of the application.

Figure 2:
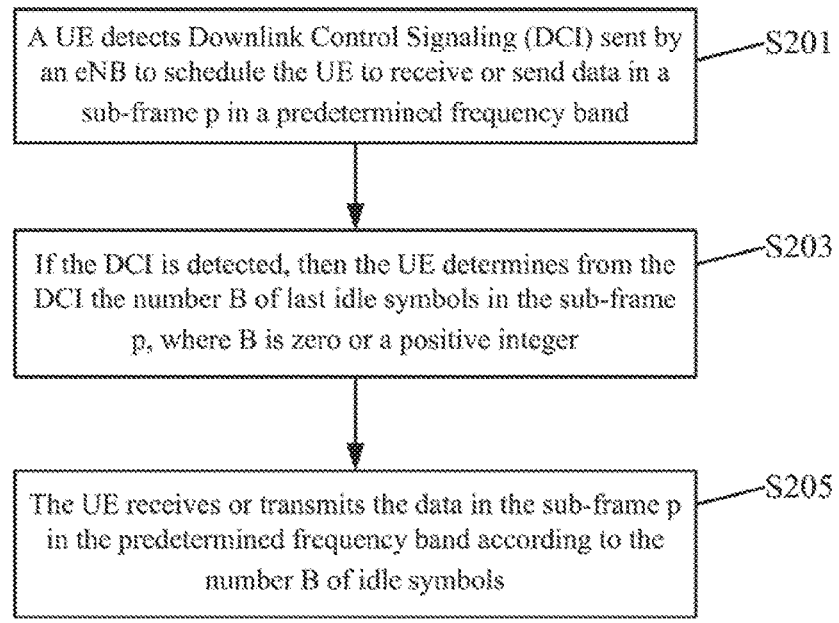
FIG. 2 is a schematic flow chart of another method for transmitting data according to an embodiment of the application.

As illustrated in FIG. 2, a method for transmitting data according to an embodiment of the application includes:

In the step S201, a UE detects Downlink Control Signaling (DCI) sent by an eNB to schedule the UE to receive or send data in a sub-frame p in a predetermined frequency band;

In the step S203, if the DCI is detected, then the UE determines from the DCI the number B of last idle symbols in the sub-frame p, where B is zero or a positive integer; and In the step S205, the UE receives or transmits the data in the sub-frame p in the predetermined frequency band according to the number B of idle symbols.

Where if the UE determines from the DCI the number B of last idle symbols in the sub-frame p, then if the DCI includes information indicating that the last A symbols in the sub-frame p are idle, then the UE determines the number B of symbols as A; otherwise, the UE determines the number B of symbols as zero, where A is a positive integer, and the total length of time corresponding to the last A symbols is no less than a first length of time.

Where the value of A is prescribed, or signaled by the eNB to the UE.

Where the value of the first length of time is prescribed, or determined by exchanging information between the eNB and another eNB.

Optionally if the value of the first length of time is prescribed, then the value of the first length of time can be determined as a function of a system bandwidth, or a necessary delay in processing by the eNB.

Moreover if the UE determines from the DCI the number B of last idle symbols in the sub-frame p, then if the DCI includes information indicating the number of last idle symbols in the sub-frame p, then the UE determines the number B of symbols as the number of last idle symbols indicated by the DCI.

Furthermore the method for transmitting data further includes: if no DCI is detected, then the UE receives a predetermined signal sent by the eNB in the last C symbols in the sub-frame p in the predetermined frequency band, where C is zero or a positive integer.

Where the predetermined signal includes a synchronization signal and/or a measurement reference signal.

Where the value of C is prescribed, or signaled by the eNB to the UE.

Where if the UE receives or transmits the data in the sub-frame p in the predetermined frequency band according to the number B of idle symbols, then if the data scheduled by the DCI are downlink data, then the UE receives the data in the first (L-B) symbols in the sub-frame p in the predetermined frequency band; and if the data scheduled by the DCI are uplink data, then the UE transmits the data in the first (L-B) symbols in the sub-frame p in the predetermined frequency band, where L is the largest number of symbols in the sub-frame p.

In the solution above, the predetermined frequency band includes an unlicensed frequency band.

In order to facilitate understanding of the technical solutions above of the application, the technical solutions above of the application will be described below by way of particular embodiments thereof taking a predetermined frequency band which is an unlicensed frequency band as an example.

First Embodiment

Figure 3:
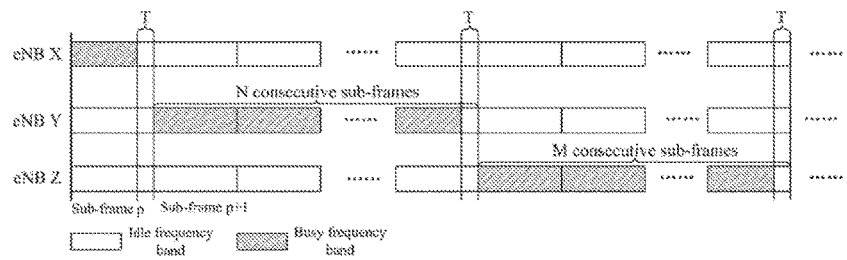
FIG. 3 is a schematic principle diagram of a method for transmitting data according to an embodiment of the application.

FIG. 3 is a schematic principle diagram of a method for transmitting data according to this embodiment, and as can be apparent from FIG. 3, an LTE eNB Y detects an unlicensed frequency band for at least T idle milliseconds in a predetermined period of time in any sub-frame p, and if the at least T idle milliseconds are detected, then it indicates that the carrier is currently idle, and at this time, the eNB Y can transmit data over the carrier in N consecutive sub-frames starting from the sub-frame p+1.

In order to enable a number of LTE eNBs to access resources in the unlicensed frequency band fairly and efficiently, the unlicensed frequency band can be idled in the last component in the period of time in which the resources in the frequency band are occupied by the eNB Y so that the other eNBs can detect the frequency band in this part of the period of time, and if the other eNBs detect the idle frequency band, then they can transmit data in the frequency band immediately in a next sub-frame; otherwise, after the eNB Y transmits all the data in the sub-frame (p+N), then the other eNBs can detect the idle frequency band in the sub-frame (p+N+1), but they will not transmit data until at least the sub-frame (p+N+2), so that the sub-frame (p+N+1) may be wasted as a result.

Second Embodiment

Figure 4:
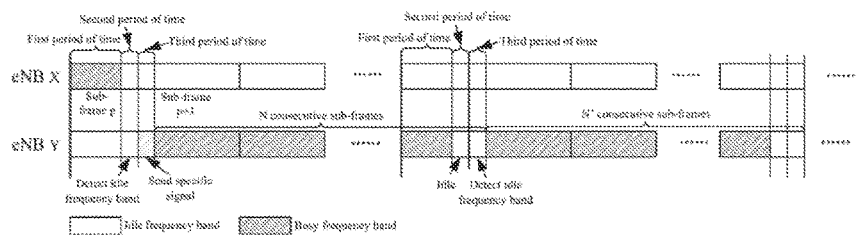
FIG. 4 is a schematic principle diagram of a method for transmitting data according to another embodiment of the application.

FIG. 4 is a schematic principle diagram of a method for transmitting data according to this embodiment, and as can be apparent from FIG. 4, the sub-frame p includes a first period of time, a second period of time, and a third period of time. An eNB Y does not schedule data to be transmitted in the first period of time in the sub-frame p, detects an idle frequency band in the second period of time in the sub-frame p, and subsequently sends a Primary SYNC Signal (PSS)/Supplement SYNC Signal (SSS), and a measurement Reference Signal (RS) in the third period of time in the sub-frame p, and schedules data in N consecutive sub-frames starting from the sub-frame (p+1) and transmits the data, where all the N sub-frames can be downlink sub-frames or uplink sub-frames, or a part thereof can be downlink sub-frames, and the other part thereof can be uplink sub-frames, or a part thereof can be downlink sub-frames, and the other part thereof can be special sub-frames, or a part thereof can be downlink sub-frames, a part thereof can be special sub-frames, and the other part thereof can be uplink sub-frames. The eNB Y is idle for the second period of time in the sub-frame (p+N), and in this period of time, all the eNBs and nodes (LTE or WIFI nodes) intending to access the unlicensed frequency band can detect spectrum resources, where the other eNBs and nodes detecting the idle frequency band can transmit specific signals in the third period of time in the sub-frame (p+N) in the frequency band. If the eNB Y has further data to be transmitted following the sub-frame (p+N), then if the eNB Y further detects the idle third period of time in the sub-frame (p+N), then the eNB Y further transmits data in a sub-frame following the sub-frame (p+N+1).

Third Embodiment

Figure 5:
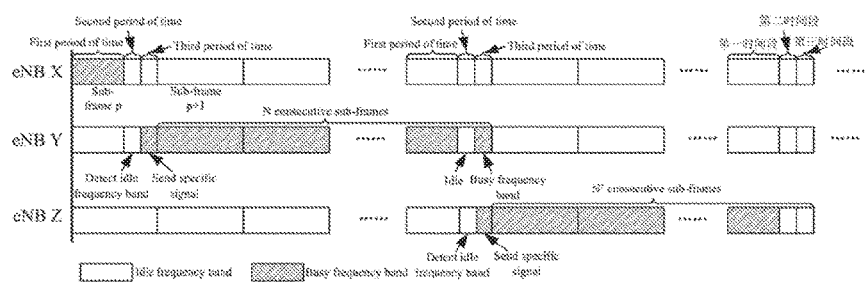
FIG. 5 is a schematic principle diagram of a method for transmitting data according to a further embodiment of the application.

FIG. 5 is a schematic principle diagram of a method for transmitting data according to this embodiment, and as can be apparent from FIG. 5, the sub-frame p includes a first period of time, a second period of time, and a third period of time. An eNB Y does not schedule data to be transmitted in the first period of time in the sub-frame p, detects an idle frequency band in the second period of time in the sub-frame p, and subsequently sends a PSS/SSS, and a measurement RS in the third period of time in the sub-frame p, and schedules data in N consecutive sub-frames starting from the sub-frame (p+1) and transmits the data, where all the N sub-frames can be downlink sub-frames or uplink sub-frames, or a part thereof can be downlink sub-frames, and the other part thereof can be uplink sub-frames, or a part thereof can be downlink sub-frames, and the other part thereof can be special sub-frames, or a part thereof can be downlink sub-frames, a part thereof can be special sub-frames, and the other part thereof can be uplink sub-frames. The eNB Y is idle for the second period of time in the sub-frame (p+N), and in this period of time, all the eNBs and nodes (LTE or WIFI nodes) intending to access the unlicensed frequency band can detect spectrum resources, where the other eNBs and nodes detecting the idle frequency band can transmit signals in the third period of time in the sub-frame (p+N) in the frequency band. If the eNB Y has further data to be transmitted following the sub-frame (p+N), then the eNB Y further detects the idle third period of time in the sub-frame (p+N), and at this time, an eNB Z has transmitted a signal in the third period of time, so that the eNB Z will schedule data to be transmitted in consecutive sub-frames following the sub-frame (p+N+1) and will transmit the data, and if the eNB Y does not detect the idle third period of time, then the eNB will not schedule data to be transmitted in the consecutive sub-frames following the sub-frame (p+N+1).

Fourth Embodiment

Further referring to FIG. 5, as can be apparent from FIG. 5, a UE served by the eNB Y does not receive scheduling signal sent by the eNB Y in the sub-frame p, but receives the specific signal in the third period of time in the sub-frame p, so that the UE can perform carrier time/frequency synchronization, mobility measurement, Channel State Information (CSI) measurement, etc., based upon the received specific signal. Subsequently the UE receives the scheduling signal sent by the eNB Y in the sub-frame (p+N) to indicate that the last B symbols in the sub-frame (p+N) are idle, where the total length of time of the B symbols is no less than the second period of time and the third period of time (equal thereto as illustrated), then the UE will not detect the specific signal sent by the eNB Y in the third period of time in the sub-frame (p+N).

A UE served by the eNB Z does not receive scheduling signal sent by the eNB Z in the sub-frame p, and further receives the specific signal (the PSS/SSS and the measurement RS) in the third period of time in the sub-frame p, and thus determines that the eNB Z does not transmit the specific signal in the sub-frame p. Subsequently the UE does not receive scheduling signal sent by the eNB Z in the sub-frame (p+N) either, but receives the specific signal in the third period of time in the sub-frame (p+N), so that the UE can perform carrier time/frequency synchronization, mobility measurement, Channel State Information (CSI) measurement, etc., based upon the received specific signal.

As can be apparent, with the technical solutions of the application, the LTE system can detect spectrum resources and obviate in the unlicensed frequency band, and also a number of LTE systems can operate fairly and efficiently in the unlicensed frequency band.

Moreover there are further provided two eNBs according to embodiments of the application.

Figure 6:
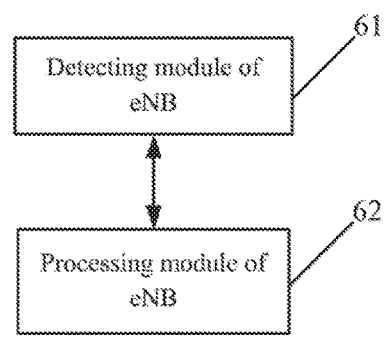
FIG. 6 is a structural block diagram of an eNB according to an embodiment of the application.

As illustrated in FIG. 6, an eNB according to an embodiment of the application includes:

A detecting module 61 of the eNB is configured to detect a predetermined frequency band for being idle for a first length of time in a predetermined period of time in a sub-frame p in the predetermined frequency band; and A processing module 62 of the eNB is configured, if the idle for the first length of time is detected, to schedule data in N consecutive sub-frames starting from a sub-frame next to the sub-frame p and to perform data transmission for the data, and to set last A symbols in the last one of the consecutive N sub-frames to be idle, where the total length of time corresponding to the A symbols is no less than the first length of time, and both N and A are positive integers.

Moreover the eNB further includes: a first sending module (not illustrated) configured to send Downlink Control Signaling (DCI) to a UE to schedule the UE to receive or send data in the predetermined frequency band, where the DCI includes information indicating whether last A symbols in a sub-frame scheduled by the DCI are idle, or the number of last idle symbols.

Where the value of A is prescribed, or signaled by the eNB to the UE.

Where the value of the first length of time is prescribed, or determined by exchanging information between the eNB and another eNB.

Optionally if the value of the first length of time is prescribed, then the value of the first length of time can be determined as a function of a system bandwidth, or a necessary delay in processing by the eNB.

Optionally on one hand, the predetermined period of time is located in the last component of the sub-frame p in the predetermined frequency band.

Optionally on the other hand, the sub-frame p includes at least a first interval of time, a second interval of time, and a third interval of time in the predetermined frequency band; where the first interval of time is located at the starting position of the sub-frame p, the third interval of time is located at the ending position of the sub-frame p, and the second interval of time is located before the third interval of time, and does not overlap with the first interval of time; and the length of time of neither the second interval of time nor the third interval of time is less than the first length of time; and if the processing module 62 of the eNB does not schedule the data to be transmitted in the first interval of time of the sub-frame p, then the predetermined period of time is the second interval of time; and if the processing module 62 of the eNB schedules the data to be transmitted in the first interval of time of the sub-frame p, then the predetermined period of time is the third interval of time.

Where the value of the first interval of time and/or the second interval of time and/or the third interval of time is prescribed, or determined by exchanging information between the eNB and another eNB.

Where if the processing module 62 of the eNB sets the last A symbols in the last one of the N consecutive sub-frames to be idle, then the total length of time corresponding to the last A symbols is no less than the sum of the lengths of the second interval of time and the third interval of time.

Moreover the eNB further includes: a second sending module (not illustrated) configured, if the predetermined period of time is the second interval of time, to send a predetermined signal in the predetermined frequency band in the last C symbols in the third interval of time, where C is a positive integer.

Where the predetermined signal includes a synchronization signal and/or a measurement reference signal.

Where the value of C is prescribed, or signaled by the eNB to the UE.

In the solution above, the N sub-frames includes one or more of a downlink sub-frame, an uplink sub-frame, and a special sub-frame.

In the solution above, the predetermined frequency band includes an unlicensed frequency band.

Figure 7:
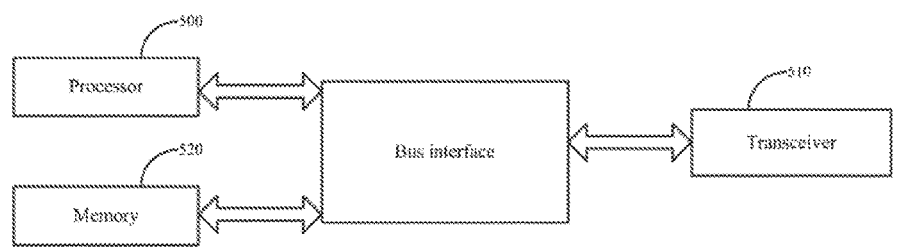
FIG. 7 is a structural block diagram of another eNB according to an embodiment of the application.

As illustrated in FIG. 7, another eNB according to an embodiment of the application includes:

A processor 500 is configured to read program stored in a memory 520:

To detect a predetermined frequency band for being idle for a first length of time in a predetermined period of time in a sub-frame p in the predetermined frequency band; and If the idle for the first length of time is detected, to schedule data in N consecutive sub-frames starting from a sub-frame next to the sub-frame p and to perform data transmission for the data, and to set last A symbols in the last one of the consecutive N sub-frames to be idle, where the total length of time corresponding to the A symbols is no less than the first length of time, and both N and A are positive integers.

Moreover the processor 500 is further configured to read the program to send Downlink Control Signaling (DCI) to a UE through a transceiver 510 to schedule the UE to receive or send data in the predetermined frequency band, where the DCI includes information indicating whether last A symbols in a sub-frame scheduled by the DCI are idle, or the number of last idle symbols.

Where the value of A is prescribed, or signaled by the eNB to the UE.

Where the value of the first length of time is prescribed, or determined by exchanging information between the eNB and another eNB.

Optionally if the value of the first length of time is prescribed, then the value of the first length of time can be determined as a function of a system bandwidth, or a necessary delay in processing by the eNB.

Optionally on one hand, the predetermined period of time is located in the last component of the sub-frame p in the predetermined frequency band.

Optionally on the other hand, the sub-frame p includes at least a first interval of time, a second interval of time, and a third interval of time in the predetermined frequency band; where the first interval of time is located at the starting position of the sub-frame p, the third interval of time is located at the ending position of the sub-frame p, and the second interval of time is located before the third interval of time, and does not overlap with the first interval of time; and the length of time of neither the second interval of time nor the third interval of time is less than the first length of time; and if the processor 500 does not schedule the data to be transmitted in the first interval of time of the sub-frame p, then the predetermined period of time is the second interval of time; and if the processor 500 schedules the data to be transmitted in the first interval of time of the sub-frame p, then the predetermined period of time is the third interval of time.

Where the value of the first interval of time and/or the second interval of time and/or the third interval of time is prescribed, or determined by exchanging information between the eNB and another eNB.

Where if the processor 500 sets the last A symbols in the last one of the N consecutive sub-frames to be idle, then the total length of time corresponding to the last A symbols is no less than the sum of the lengths of the second interval of time and the third interval of time.

Moreover the processor 500 is further configured, if the predetermined period of time is the second interval of time, to send a predetermined signal through the transceiver 510 in the predetermined frequency band in the last C symbols in the third interval of time, where C is a positive integer.

Where the predetermined signal includes a synchronization signal and/or a measurement reference signal.

Where the value of C is prescribed, or signaled by the eNB to the UE.

In the solution above, the N sub-frames includes one or more of a downlink sub-frame, an uplink sub-frame, and a special sub-frame.

In the solution above, the predetermined frequency band includes an unlicensed frequency band.

The transceiver 510 is configured to be controlled by the processor 500 to receive and send data.

Here in FIG. 7, the bus architecture can include any number of interconnected buses and bridges and particularly link together one or more processors represented by the processor 500, one or more memories represented by the memory 520, and various other circuits. The bus architecture can further link together various other circuits, e.g., peripheral devices, a voltage stabilizer, a power management circuit, etc., and all these circuits are well known in the art, so a further description thereof will be omitted in this context. The bus interface serves as an interface. The transceiver 510 can include a number of elements including a transmitter and a receiver serving as elements configured to communicate with various other devices over a transmission medium.

The processor 500 is responsible for managing the bus architecture and performing other normal processes, and the memory 520 can store data for use by the processor 500 in performing the operations.

Furthermore there are provided two UEs according to embodiments of the application.

Figure 8:
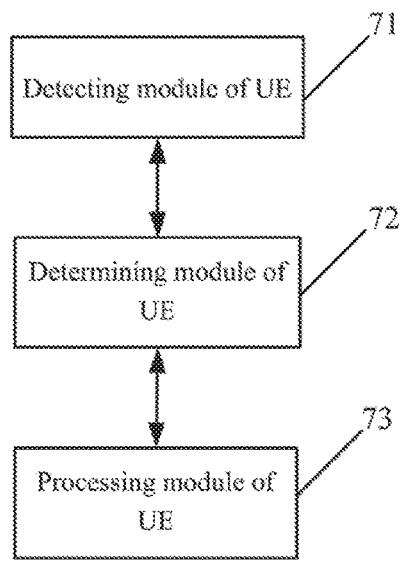
FIG. 8 is a structural block diagram of a UE according to an embodiment of the application.

As illustrated in FIG. 8, a UE according to an embodiment of the application includes:

A detecting module 71 of the UE is configured to detect Downlink Control Signaling (DCI) sent by an eNB to schedule the UE to receive or send data in a sub-frame p in a predetermined frequency band;

A determining module 72 of the UE is configured, if the DCI is detected, to determine from the DCI the number B of last idle symbols in the sub-frame p, where B is zero or a positive integer; and A processing module 73 of the UE is configured to receive or send the data in the sub-frame p in the predetermined frequency band according to the number B of idle symbols.

Where the determining module 72 of the UE further includes: a first determining sub-module (not illustrated) configured, if the DCI includes information indicating that the last A symbols in the sub-frame p are idle, to determine the number B of symbols as A; otherwise, to determine the number B of symbols as zero, where A is a positive integer, and the total length of time corresponding to the last A symbols is no less than a first length of time.

Where the value of A is prescribed, or signaled by the eNB to the UE.

Where the value of the first length of time is prescribed, or determined by exchanging information between the eNB and another eNB.

Optionally if the value of the first length of time is prescribed, then the value of the first length of time can be determined as a function of a system bandwidth, or a necessary delay in processing by the eNB.

Moreover the determining module 72 of the UE further includes: a second determining sub-module (not illustrated) configured, if the DCI includes information indicating the number of last idle symbols in the sub-frame p, to determine the number B of symbols as the number of last idle symbols indicated by the DCI.

Furthermore the UE further includes: a receiving module (not illustrated) configured, if no DCI is detected, to receive a predetermined signal sent by the eNB in the last C symbols in the sub-frame p in the predetermined frequency band, where C is zero or a positive integer.

Where the predetermined signal includes a synchronization signal and/or a measurement reference signal.

Where the value of C is prescribed, or signaled by the eNB to the UE.

Where the processing module 73 of the UE further includes: a receiving sub-module (not illustrated) configured, if the data scheduled by the DCI are downlink data, to receive the data in the first (L-B) symbols in the sub-frame p in the predetermined frequency band; and a sending sub-module (not illustrated) configured, if the data scheduled by the DCI are uplink data, to send the data in the first (L-B) symbols in the sub-frame p in the predetermined frequency band, where is the largest number of symbols in the sub-frame p.

In the solution above, the predetermined frequency band includes an unlicensed frequency band.

Figure 9:
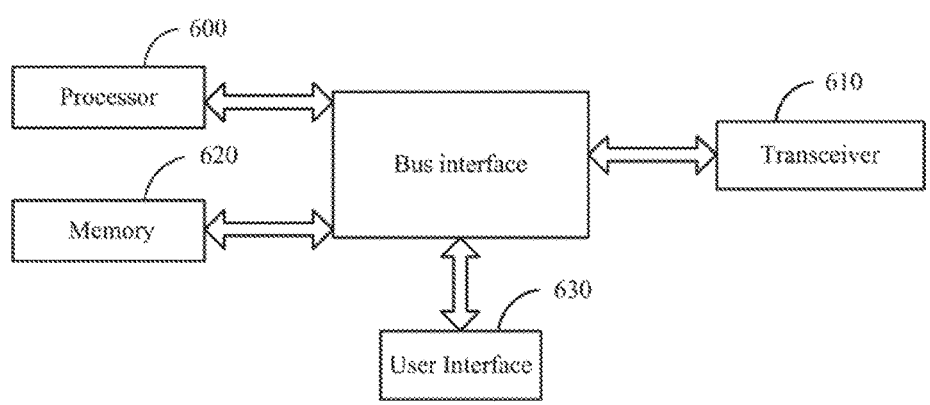
FIG. 9 is a structural block diagram of another UE according to an embodiment of the application.

As illustrated in FIG. 9, another UE according to an embodiment of the application includes:

A processor 600 is configured to read program stored in a memory 620:

To detect Downlink Control Signaling (DCI) sent by an eNB to schedule the UE to receive or send data in a sub-frame p in a predetermined frequency band;

If the DCI is detected, to determine from the DCI the number B of last idle symbols in the sub-frame p, where B is zero or a positive integer; and To receive or send the data in the sub-frame p through a transceiver 610 in the predetermined frequency band according to the number B of idle symbols.

Where the processor 600 is further configured, if the DCI includes information indicating that the last A symbols in the sub-frame p are idle, to determine the number B of symbols as A; otherwise, to determine the number B of symbols as zero, where A is a positive integer, and the total length of time corresponding to the last A symbols is no less than a first length of time.

Where the value of A is prescribed, or signaled by the eNB to the UE.

Where the value of the first length of time is prescribed, or determined by exchanging information between the eNB and another eNB.

Optionally if the value of the first length of time is prescribed, then the value of the first length of time can be determined as a function of a system bandwidth, or a necessary delay in processing by the eNB.

Moreover the processor 600 further configured, if the DCI includes information indicating the number of last idle symbols in the sub-frame p, to determine the number B of symbols as the number of last idle symbols indicated by the DCI.

Furthermore the processor 600 configured, if no DCI is detected, to receive a predetermined signal sent by the eNB through the transceiver 610 in the last C symbols in the sub-frame p in the predetermined frequency band, where C is zero or a positive integer.

Where the predetermined signal includes a synchronization signal and/or a measurement reference signal.

Where the value of C is prescribed, or signaled by the eNB to the UE.

Where the processor 600 is further configured, if the data scheduled by the DCI are downlink data, to receive the data in the first (L-B) symbols in the sub-frame p in the predetermined frequency band; and if the data scheduled by the DCI are uplink data, to send the data in the first (L-B) symbols in the sub-frame p in the predetermined frequency band, where L is the largest number of symbols in the sub-frame p.

In the solution above, the predetermined frequency band includes an unlicensed frequency band.

The transceiver 610 is configured to be controlled by the processor 600 to receive and send data.

Here in FIG. 9, the bus architecture can include any number of interconnected buses and bridges and particularly link together one or more processors represented by the processor 600, one or more memories represented by the memory 620, and various other circuits. The bus architecture can further link together various other circuits, e.g., peripheral devices, a voltage stabilizer, a power management circuit, etc., and all these circuits are well known in the art, so a further description thereof will be omitted in this context. The bus interface serves as an interface. The transceiver 610 can include a number of elements including a transmitter and a receiver serving as elements configured to communicate with various other devices over a transmission medium. For different user devices, a user interface 630 can also be an interface connected with an internal or external device as needed, and the connected device can include but will not be limited to a keypad, a display, a speaker, a microphone, a joy stick, etc.

The processor 600 is responsible for managing the bus architecture and performing other normal processes, and the memory 620 can store data for use by the processor 600 in performing the operations.

In summary, with the technical solutions above of the application, a predetermined frequency band is detected for being idle for a length of time in a predetermined period of time in a sub-frame in the predetermined frequency band; and if the length of time is detected, then it can be determined that a carrier in the predetermined frequency band is idle, so that data can be scheduled to be transmitted in a number of consecutive sub-frames starting from a sub-frame next to the sub-frame, thus enabling the LTE system to operate in the predetermined frequency band. Moreover in the application, a predetermined number of last symbols in the last one of the consecutive sub-frames are set to be idle, so that a next eNB can detect in the idle symbols, and decide data to be scheduled, thus enabling the LTE systems to operate fairly and efficiently in the predetermined period of time.

The underlying principle of the application has been described above in connection with the particular embodiments thereof, but it shall be noted that those ordinarily skilled in the art can appreciate that all or any of the steps or components in the method and the apparatus according to the application can be embodied in hardware, firmware, software, or a combination thereof in any computing device (including a processor, a storage medium, etc.) or network of computing devices, and this can be achieved by those ordinarily skilled in the art employing their general programming skills upon reading the disclosure of the application.

Thus the object of the application can also be attained by running a program or a set of programs on any computing device which can be a well-known general-purpose device. Thus the object of the application can also be attained by providing only a program product including program codes for embodying the methods or apparatuses. That is, such a program product also constitutes the application, and a storage medium in which such a program product is stored also constitutes the application. Apparently the storage medium can be any well-known storage medium or any storage medium to be developed later.

There is further provided a storage medium (which can be an ROM, an RAM, a hard disk, a removable memory, etc.) according to an embodiment of the application, which is embedded in a computer program for transmitting data, where the computer program includes code segments configured to perform the steps of: detecting a predetermined frequency band for being idle for a first length of time in a predetermined period of time in a sub-frame p in the predetermined frequency band; and if the idle for the first length of time is detected, then scheduling data in N consecutive sub-frames starting from a sub-frame next to the sub-frame p and transmitting the data, and setting last A symbols in the last one of the consecutive N sub-frames to be idle, where the total length of time corresponding to the A symbols is no less than the first length of time, and both N and A are positive integers.

According to an embodiment of the application, there is further provided a storage medium (which can be an ROM, an RAM, a hard disk, a removable memory, etc.) including a computer program for transmitting data, where the computer program includes code segments configured to perform the steps of: detecting Downlink Control Signaling (DCI) sent by an eNB to schedule the UE to receive or send data in a sub-frame p in a predetermined frequency band; if the DCI is detected, then determining from the DCI the number B of last idle symbols in the sub-frame p, where B is zero or a positive integer; and receiving or sending the data in the sub-frame p in the predetermined frequency band according to the number B of idle symbols.

There is further provided a computer program including code segments configured to perform the steps of transmitting data: detecting a predetermined frequency band for being idle for a first length of time in a predetermined period of time in a sub-frame p in the predetermined frequency band; and if the idle for the first length of time is detected, then scheduling data in N consecutive sub-frames starting from a sub-frame next to the sub-frame p and transmitting the data, and setting last A symbols in the last one of the consecutive N sub-frames to be idle, where the total length of time corresponding to the A symbols is no less than the first length of time, and both N and A are positive integers.

There is further provided a computer program including code segments configured to perform the steps of transmitting data: detecting Downlink Control Signaling (DCI) sent by an eNB to schedule the UE to receive or send data in a sub-frame p in a predetermined frequency band; if the DCI is detected, then determining from the DCI the number B of last idle symbols in the sub-frame p, where B is zero or a positive integer; and receiving or sending the data in the sub-frame p in the predetermined frequency band according to the number B of idle symbols.

In the case that the embodiments of the application are embodied in software or firmware, program constituting the software or firmware can be installed from a storage medium or a network to a computer with a dedicated hardware structure (e.g., a general-purpose computer 800 illustrated in FIG. 10) which can perform various functions, etc., above when various pieces of programs are installed thereon.

Figure 10:
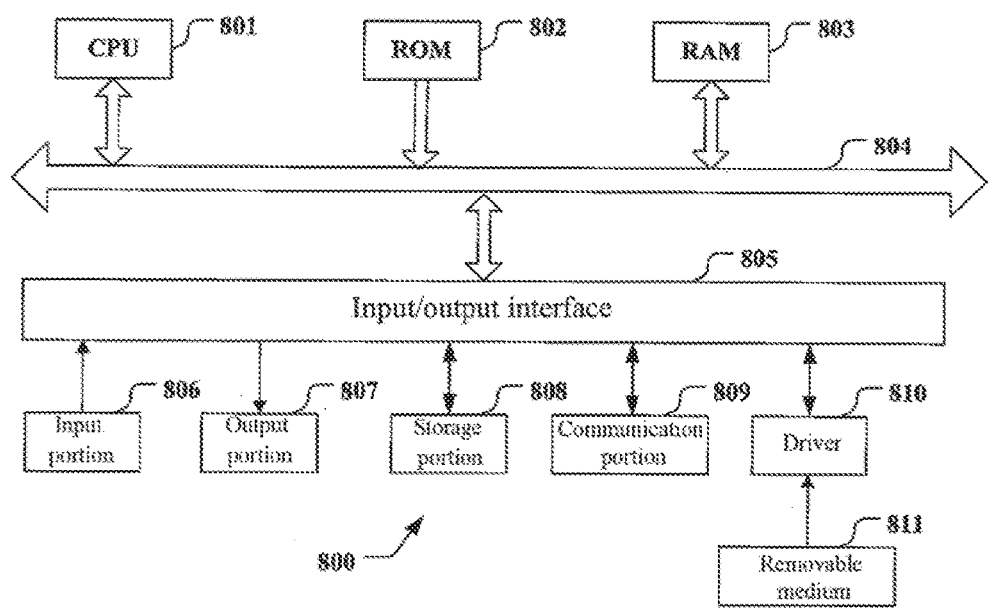
FIG. 10 is an exemplary block diagram of a computer in which the technical solutions of the application are embodied.

In FIG. 10, a Central Processing Unit (CPU) 801 performs various processes according to program stored in a Read Only Memory (ROM) 802 or loaded from a storage portion 808 into a Random Access Memory (RAM) 803 in which data required when the CPU 801 performs the various processes, etc., is also stored as needed. The CPU 801, the ROM 802, and the RAM 803 are connected to each other via a bus 804 to which an input/output interface 805 is also connected.

The following components are connected to the input/output interface 805: an input portion 806 including a keyboard, a mouse, etc.; an output portion 807 including a display, e.g., a Cathode Ray Tube (CRT), a Liquid Crystal Display (LCD), etc., a speaker, etc.; a storage portion 808 including a hard disk, etc.; and a communication portion 809 including a network interface card, e.g., an LAN card, an MODEM, etc. The communication portion 809 performs a communication process over a network, e.g., the Internet.

A driver 810 is also connected to the input/output interface 805 as needed. A removable medium 811, e.g., a magnetic disk, an optical disk, an optic-magnetic disk, a semiconductor memory, etc., can be installed on the driver 810 as needed so that computer program fetched therefrom can be installed into the storage portion 808 as needed.

In the case that the foregoing series of processes are performed in software, program constituting the software can be installed from a network, e.g., the Internet, etc., or a storage medium, e.g., the removable medium 811, etc.

Those skilled in the art shall appreciate that such a storage medium will not be limited to the removable medium 811 illustrated in FIG. 10 in which the program is stored and which is distributed separately from the apparatus to provide a user with the program. Examples of the removable medium 811 include a magnetic disk (including a Floppy Disk (a registered trademark)), an optical disk (including Compact Disk-Read Only memory (CD-ROM) and a Digital Versatile Disk (DVD)), an optic-magnetic disk (including a Mini Disk (MD) (a registered trademark)) and a semiconductor memory. Alternatively the storage medium can be the ROM 802, a hard disk included in the storage portion 808, etc., in which the program is stored and which is distributed together with the apparatus including the same to the user.

It shall be further noted that apparently the respective components or steps in the apparatuses and methods according to the application can be decomposed and/or recombined. These decompositions and/or recombinations shall be regarded as equivalent solutions of the application. Furthermore the steps of performing the foregoing series of processes can naturally be performed in a temporal sequence in the described order but may not necessarily be performed in a temporal sequence. Some of the steps can be performed concurrently or independently of each other.

Although the application and the advantages thereof have been described in details, it shall be appreciated that various changes, substitutions, and variations can be made without departing from the spirit and scope of the application as defined in the appended claims. Furthermore the terms "include", "comprise" and any variants thereof in the context are intended to encompass nonexclusive inclusion so that a process, a method, an article or a device including a series of elements includes both those elements and one or more other elements which are not listed explicitly or one or more elements inherent to the process, the method, the article or the device. Unless stated otherwise, an element being defined in the sentence "include/comprise a(n) . . ." will not exclude the presence of one or more additional identical element in the process, the method, the article or the device including the element.

The invention claimed is:

1. A method for transmitting data, the method comprising:
   detecting, by an eNB, a predetermined frequency band for being idle for a first length of time in a predetermined period of time in a sub-frame p in the predetermined frequency band; and
   if the idle for the first length of time is detected, then scheduling, by the eNB, data in N consecutive sub-frames starting from a sub-frame next to the sub-frame p and performing data transmission for the data, and setting last A symbols in the last one of the consecutive N sub-frames to be idle;
   wherein the total length of time corresponding to the A symbols is no less than the first length of time, and both N and A are positive integers.

2. The method for transmitting data according to claim 1, wherein the method further comprises:
   sending, by the eNB, Downlink Control Signaling (DCI) to a UE to schedule the UE to receive or send data in the predetermined frequency band, wherein the DCI comprises information indicating whether last A symbols in a sub-frame scheduled by the DCI are idle, or the number of last idle symbols.

3. The method for transmitting data according to claim 1, wherein the value of A is prescribed, or signaled by the eNB to the UE.

4. The method for transmitting data according to claim 1, wherein the value of the first length of time is prescribed, or determined by exchanging information between the eNB and another eNB.

5. The method for transmitting data according to claim 1, wherein the predetermined period of time is located in the last component of the sub-frame p in the predetermined frequency band.

6. The method for transmitting data according to claim 1, wherein the sub-frame p comprises at least a first interval of time, a second interval of time, and a third interval of time in the predetermined frequency band, wherein:
   the first interval of time is located at the starting position of the sub-frame p, the third interval of time is located at the ending position of the sub-frame p, and the second interval of time is located before the third interval of time, and does not overlap with the first interval of time; and the length of time of neither the second interval of time nor the third interval of time is less than the first length of time.

7. The method for transmitting data according to claim 1, wherein the N sub-frames comprises one or more of:
a downlink sub-frame, an uplink sub-frame, and a special sub-frame.

8. The method for transmitting data according to claim 1, wherein the predetermined frequency band comprises an unlicensed frequency band.

9. A method for transmitting data, the method comprising:
detecting, by a UE, Downlink Control Signaling (DCI) sent by an eNB to schedule the UE to receive or send data in a sub-frame p in a predetermined frequency band;
if the DCI is detected, then determining, by the UE, from the DCI the number B of last idle symbols in the sub-frame p, wherein B is zero or a positive integer; and
receiving or sending, by the UE, the data in the sub-frame p in the predetermined frequency band according to the number B of idle symbols.

10. The method for transmitting data according to claim 9, wherein determining, by the UE, from the DCI the number B of last idle symbols in the sub-frame p comprises:
if the DCI comprises information indicating that the last A symbols in the sub-frame p are idle, then determining, by the UE, the number B of symbols as A; otherwise, determining the number B of symbols as zero, wherein A is a positive integer, and the total length of time corresponding to the last A symbols is no less than a first length of tune.

11. The method fir transmitting data according to claim 10, wherein the value of A is prescribed, or signaled by the eNB to the UE.

12. The method for transmitting data according to claim 10, wherein the value of the first length of time is prescribed, or determined by exchanging information between the eNB and another eNB.

13. The method for transmitting data according to claim 9, wherein determining, by the UE, from the DCI the number B of last idle symbols in the sub-frame p comprises:
if the DCI comprises information indicating the number of last idle symbols in the sub-frame p, then determining the number B of symbols as the number of last idle symbols indicated by the DCI.

14. The method for transmitting data according to claim 9, wherein receiving or sending, by the UE, the data in the sub-frame p in the predetermined frequency band according to the number B of idle symbols comprises:
if the data scheduled by the DCI are downlink data, then receiving, by the UE, data in first (L-B) symbols in the sub-frame p in the predetermined frequency band; and
if the data scheduled by the DCI are uplink data, then sending, by the UE, the data in the first (L-B) symbols in the sub-frame p in the predetermined frequency hand,
wherein L is the largest number of symbols in the sub-frame p.

15. The method for transmitting data according to claim 9, wherein the predetermined frequency band comprises an unlicensed frequency band.

16. An eNB, comprising:
a processor; and
a memory storing at least one instruction configured, upon being executed by the processor to cause the eNB:
to detect a predetermined frequency band for being idle for a first length of time in a predetermined period of time in a sub-frame p in the predetermined frequency band; and
if the idle for the first length of time is detected, to schedule data in N consecutive sub-frames starting from a sub-frame next to the sub-frame p and to perform data transmission for the data, and to set last A symbols in the last one of the consecutive N sub-frames to be idle;
wherein the total length of time corresponding to the A symbols is no less than the first length of time, and both N and A are positive integers.

17. The eNB according to claim 16, wherein the at least one instruction configured, upon being executed by the processor to cause the eNB:
to send Downlink Control Signaling (DCI) to a UE to schedule the UE to receive or send data in the predetermined frequency band, wherein the DCI comprises information indicating whether last A symbols in a sub-frame scheduled by the DCI are idle, or the number of last idle symbols.

18. The eNB according to claim 16, wherein the sub-frame p comprises at least a first interval of time, a second interval of time, and a third interval of time in the predetermined frequency band, wherein:
the first interval of time is located at the starting position of the sub-frame p, the third interval of time is located at the ending position of the sub-frame p, and the second interval of time is located before the third interval of time, and does not overlap with the first interval of time; and the length of time of neither the second interval of time nor the third interval of time is less than the first length of time.

19. A UE, comprising:
a processor; and
a memory storing at least one instruction configured, upon being executed by the processor to cause the UE:
to detect Downlink Control Signaling (DCI) sent by an eNB to schedule the UE to receive or send data in a sub-frame p in a predetermined frequency band; and,
if the DCI is detected, to determine from the DCI the number B of last idle symbols in the sub-frame p, wherein B is zero or a positive integer; and
to receive or send the data in the sub-frame p in the predetermined frequency band according to the number B of idle symbols.

20. The UE according to claim 19, wherein the at least one instruction configured, upon being executed by the processor to cause the UE:
if the DCI comprises information indicating that the last A symbols in the sub-frame p are idle, to determine the number B of symbols as A; otherwise, to determine the number B of symbols as zero, wherein A is a positive integer, and the total length of time corresponding to the last A symbols is no less than a first length of time.

* * * * *